US012749771B2

(12) United States Patent
Won et al.

(10) Patent No.: US 12,749,771 B2
(45) Date of Patent: Sep. 29, 2026

(54) FOLDABLE POUCH-SHAPED BATTERY CELL AND METHOD OF MANUFACTURING THE SAME

(71) Applicant: LG Energy Solution, Ltd., Seoul (KR)

(72) Inventors: Kwang Ho Won, Daejeon (KR); Young Hoon Kim, Daejeon (KR); Ki Tae Kim, Daejeon (KR); Chan Ki Park, Daejeon (KR); Jung Shik Oh, Daejeon (KR); Hyun Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1028 days.

(21) Appl. No.: 17/913,614

(22) PCT Filed: May 24, 2021

(86) PCT No.: PCT/KR2021/006449
§ 371 (c)(1),
(2) Date: Sep. 22, 2022

(87) PCT Pub. No.: WO2021/135910
PCT Pub. Date: Nov. 25, 2021

(65) Prior Publication Data

US 2023/0145579 A1 May 11, 2023

(30) Foreign Application Priority Data

May 22, 2020 (KR) ........................ 10-2020-0061358

(51) Int. Cl.
*H01M 50/474* (2021.01)
*H01M 10/04* (2006.01)
(Continued)

(52) U.S. Cl.
CPC ....... *H01M 50/474* (2021.01); *H01M 50/105* (2021.01); *H01M 50/538* (2021.01);
(Continued)

(58) Field of Classification Search
CPC ............. H01M 50/474; H01M 50/105; H01M 50/538; H01M 50/178; H01M 50/136;
(Continued)

(56) References Cited

U.S. PATENT DOCUMENTS 10,014,551 B2 7/2018 Ahn
2003/0099880 A1 * 5/2003 Park .................... H01M 50/571 429/246

(Continued)

FOREIGN PATENT DOCUMENTS

CN 105981196 A 9/2016
JP 2003100350 A 4/2003

(Continued)

OTHER PUBLICATIONS

Search Report dated Dec. 21, 2023 from the Office Action for Chinese Application No. 202180011928.8 issued Dec. 27, 2023, 3 pages.

(Continued)

*Primary Examiner* — Matthew W Van Oudenaren
(74) *Attorney, Agent, or Firm* — Lerner David LLP

(57) ABSTRACT

The present invention relates to a pouch-shaped battery cell having an electrode assembly in a pouch-shaped battery case, the electrode assembly including positive electrodes and negative electrodes, each of the positive electrodes and the negative electrodes having a structure in which the length of the electrode in a width direction is less than the length of the electrode in a length direction, each of the positive electrodes and the negative electrodes has an uncoated portion extending parallel to outer peripheries of the electrode in the overall width direction or outer peripheries of the electrode in the overall length direction and a coated portion, which is coated with an electrode mixture, formed at the remaining portion of the electrode excluding (Continued)

the uncoated portion, and a stepped structure is formed at the part of the pouch-shaped battery case corresponding to the uncoated portion so as to be recessed inwards.

8 Claims, 6 Drawing Sheets

(51) Int. Cl.

| | |
|---|---|
| ***H01M 50/105*** | (2021.01) |
| ***H01M 50/136*** | (2021.01) |
| ***H01M 50/178*** | (2021.01) |
| ***H01M 50/531*** | (2021.01) |
| ***H01M 50/538*** | (2021.01) |
| ***H01M 50/586*** | (2021.01) |

(52) U.S. Cl.
CPC ........ *H01M 10/045* (2013.01); *H01M 50/136* (2021.01); *H01M 50/178* (2021.01); *H01M 50/531* (2021.01); *H01M 50/586* (2021.01)

(58) Field of Classification Search
CPC ............. H01M 50/112; H01M 50/531; H01M 50/557; H01M 50/586; H01M 50/595; H01M 50/184; H01M 50/186; H01M 50/202; H01M 50/211; H01M 50/238; H01M 50/296; H01M 50/55; H01M 50/553; H01M 10/052; H01M 10/0585; H01M 10/0463; H01M 10/0413; H01M 10/0436; H01M 10/045; H01M 10/4235; H01M 10/0431; H01M 10/0459; H01M 10/0583; H01M 10/125; H01M 2220/30; H01M 4/04; H01M 4/0404; H01M 4/0435; H01M 2004/021
See application file for complete search history.

(56) References Cited

U.S. PATENT DOCUMENTS

| | | | | |
|---|---|---|---|---|
| 2012/0058387 | A1 | 3/2012 | Ahn | |
| 2017/0033327 | A1* | 2/2017 | Tajima | H01M 50/119 |
| 2017/0170437 | A1* | 6/2017 | Lee | H01M 50/184 |
| 2018/0205046 | A1 | 7/2018 | Schmid-Schoenbein | |
| 2018/0269458 | A1 | 9/2018 | Oh et al. | |

FOREIGN PATENT DOCUMENTS

| | | | |
|---|---|---|---|
| JP | 2015173219 | A | 10/2015 |
| JP | 2017033932 | A | 2/2017 |
| JP | 2017506412 | A | 3/2017 |
| JP | 2017147222 | A | 8/2017 |
| JP | 2018113253 | A | 7/2018 |
| KR | 20050030295 | * | 3/2005 |
| KR | 20120022385 | A | 3/2012 |
| KR | 20150089448 | A | 8/2015 |
| KR | 20150096325 | A | 8/2015 |
| KR | 20150128063 | A | 11/2015 |
| KR | 20170000079 | A | 1/2017 |
| KR | 20170033513 | A | 3/2017 |
| KR | 20170070401 | A | 6/2017 |
| WO | WO2019045447 | * | 3/2019 |

OTHER PUBLICATIONS

Extended European Search Report including Written Opinion for Application No. 21807925.9 dated Mar. 15, 2024, pp. 1-7.

International Search Report for PCT/KR2021/006449 mailed Sep. 1, 2021. 3 pgs.

* cited by examiner

【FIG. 1】
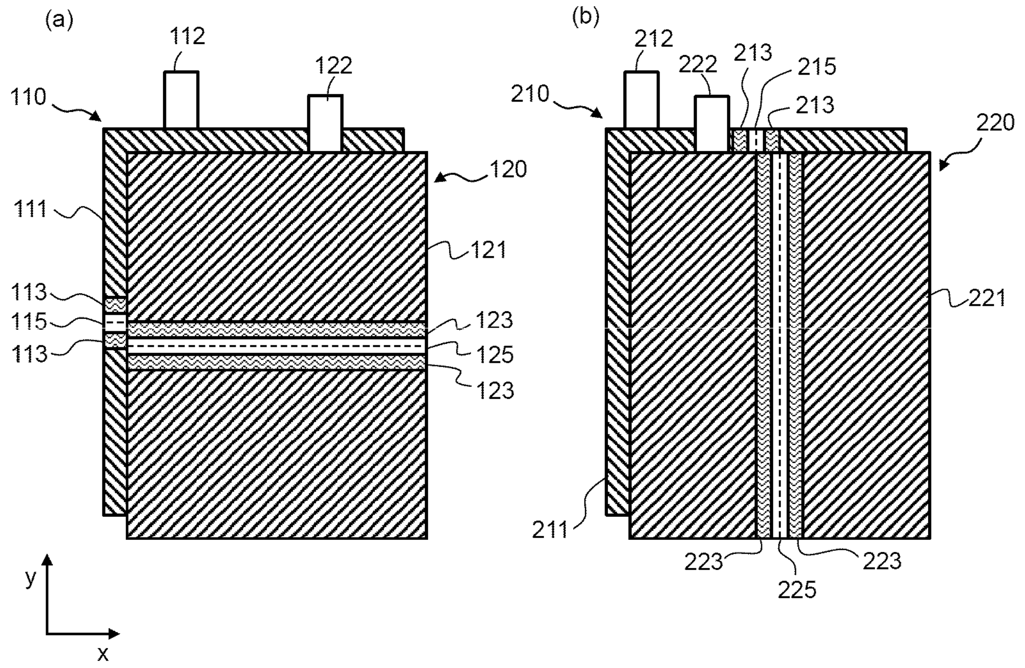
【FIG. 2】
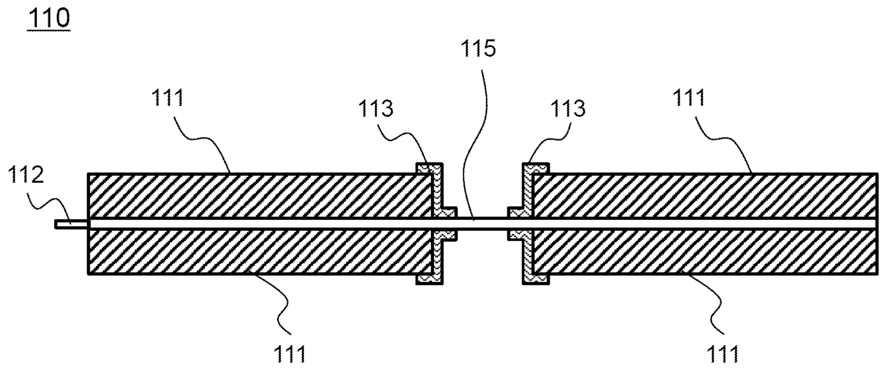

【FIG. 3】
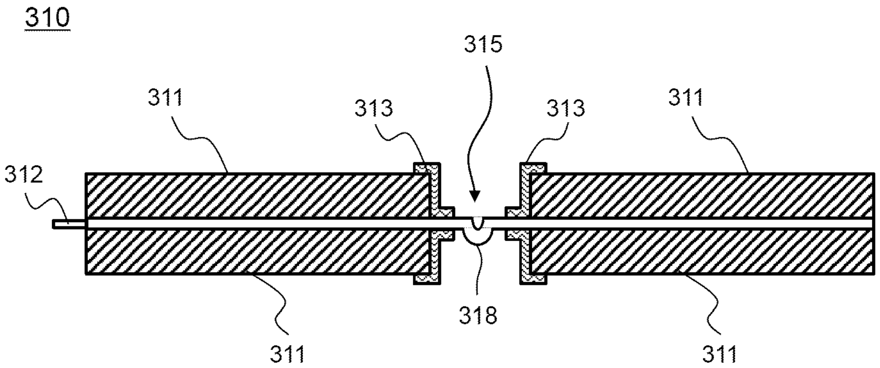
【FIG. 4】
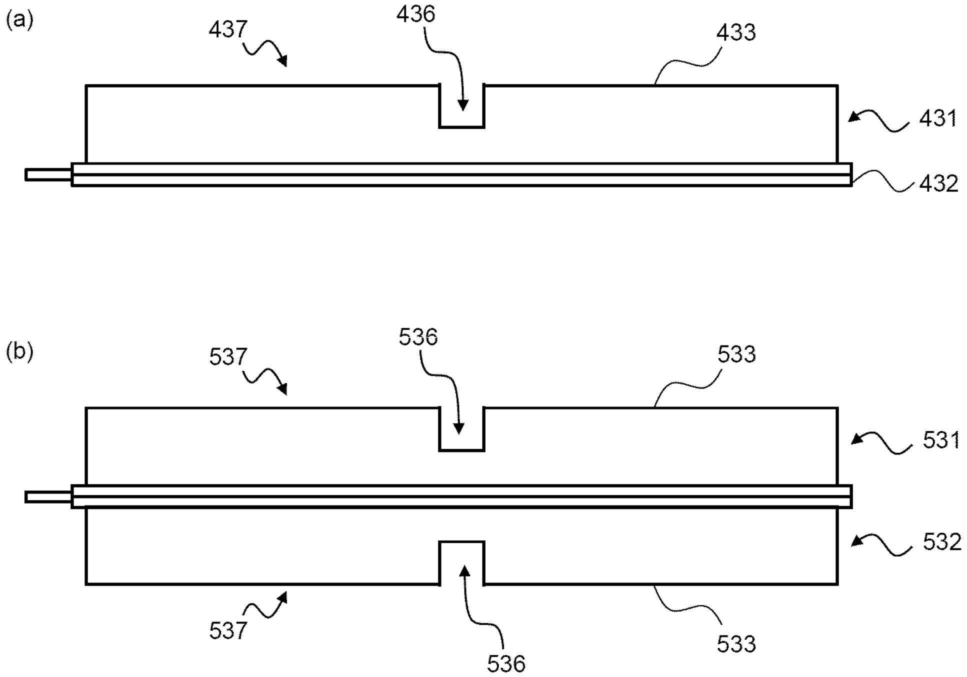

【FIG. 5】
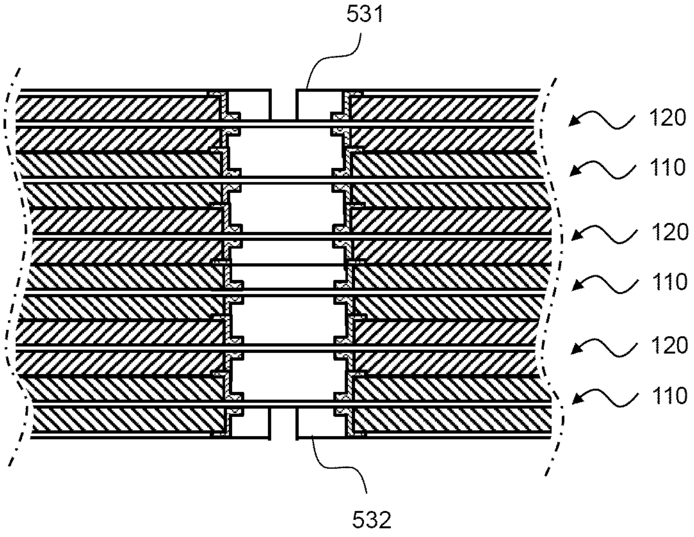
【FIG. 6】
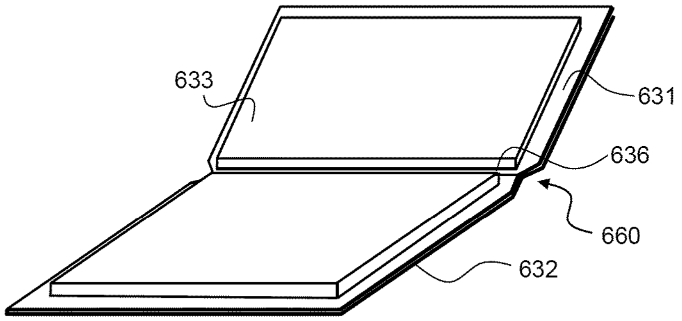

【FIG. 7】
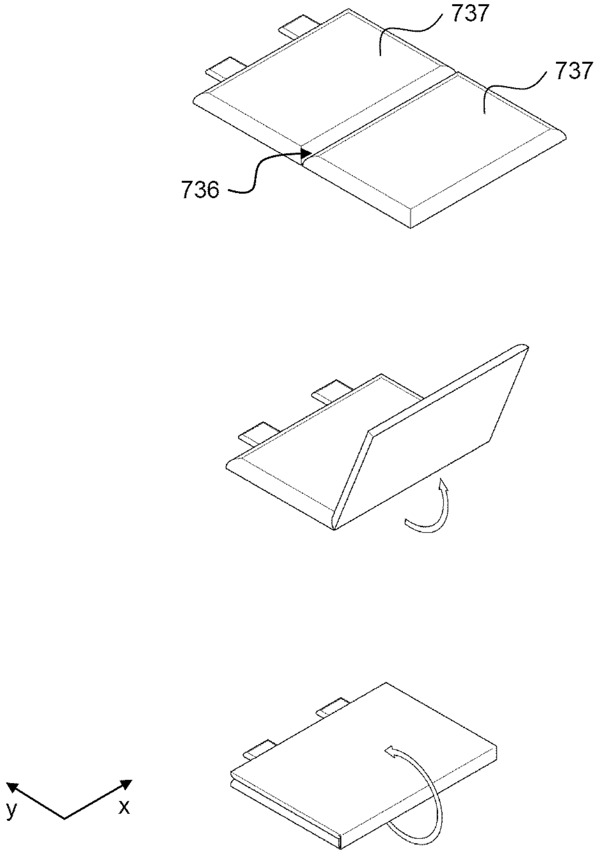

【FIG. 8】
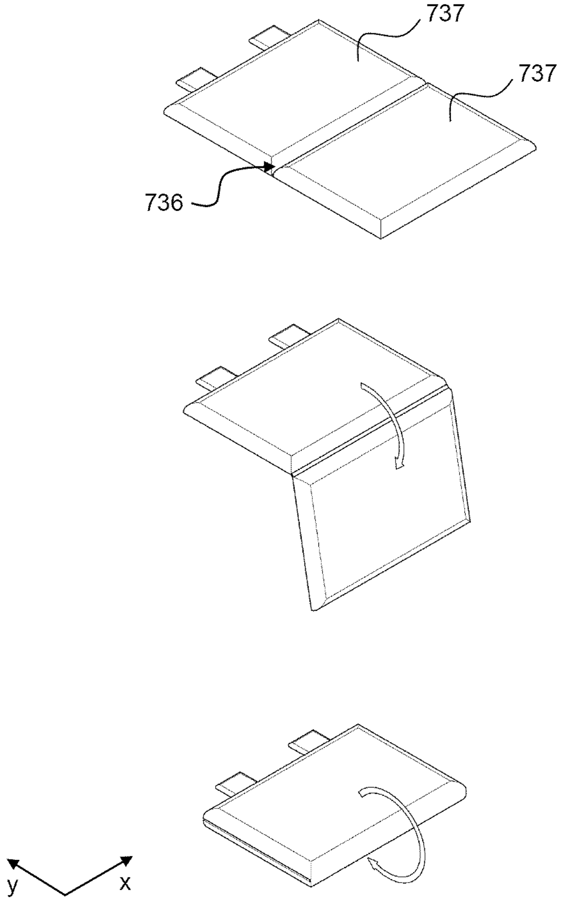

【FIG. 9】
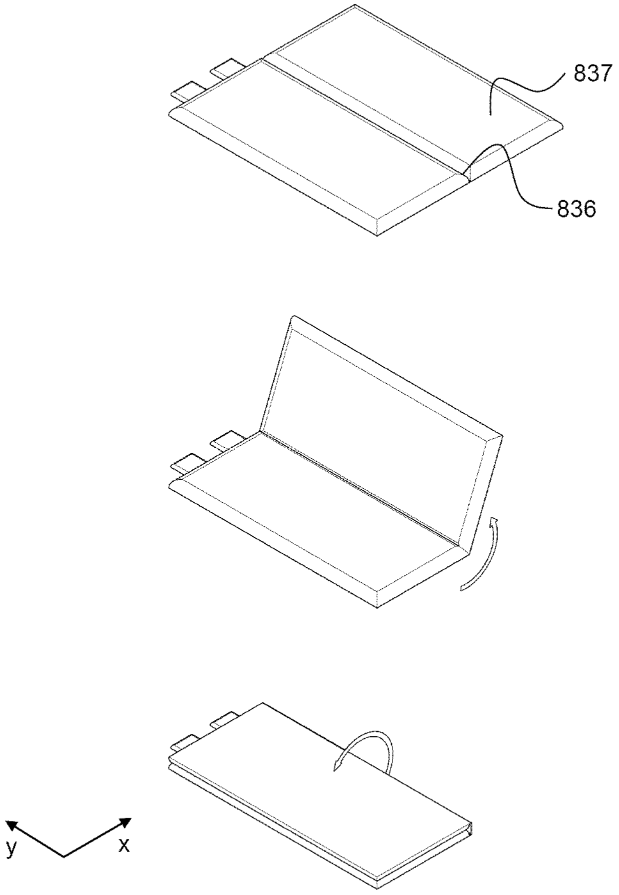

FOLDABLE POUCH-SHAPED BATTERY CELL AND METHOD OF MANUFACTURING THE SAME

CROSS-REFERENCE TO RELATED APPLICATIONS

This application is a national stage entry under 35 U.S.C. § 371 of International Application No. PCT/KR2021/006449, filed on May 24, 2021, which claims priority to Korean Patent Application No. 10-2020-0061358 filed on May 22, 2020, the disclosures of which areis hereby incorporated herein by reference in their entireties.

TECHNICAL FIELD

The present invention relates to a foldable pouch-shaped battery cell and a method of manufacturing the same, and more particularly to a foldable pouch-shaped battery cell configured such that an uncoated portion, which is a portion coated with no electrode mixture, is formed at a portion of the battery cell to be folded and a stepped structure having a recessed shape is formed at the portion of a pouch-shaped battery case corresponding to the uncoated portion, whereby it is possible to prevent movement of the electrode assembly, a method of manufacturing the same.

BACKGROUND ART

A lithium secondary battery, which is capable of being charged and discharged, has been widely used as an energy source for wireless mobile devices or wearable devices, and has also been used as an energy source for electric vehicles and hybrid electric vehicles presented as alternatives to existing gasoline and diesel vehicles, which cause air pollution.

In addition, with an increase in kinds of miniaturized multifunctional products and a trend of emphasizing design in electronic devices, the number of products based on new shapes, such as a shape including a curve or a geometrical shape, other than conventional simple structures, such as a planar structure and a prismatic structure, has increased.

Lithium secondary batteries having various shapes, such as a stepped shape and a polygonal shape, other than a rectangular shape, have been developed in order to apply the lithium secondary batteries to such products having various shapes.

For example, for a smartphone, the side thereof is curved in order to improve sensation of grip, and flexible display products capable of being bent or folded have come on the stage.

In the case in which a rectangular battery cell is used in a bendable or foldable device, there is a problem in that dead space is formed in large numbers. Therefore, it is necessary to develop a battery cell capable of securing capacity while reducing dead space even though the battery cell is mounted in a device having an atypical shape.

In connection therewith, Patent Document 1 discloses a secondary battery configured such that a positive electrode active material layer and a negative electrode active material layer are formed by coating so as to be spaced apart from each other by a predetermined distance and including a bending region configured to be bent at an uncoated portion, which is not coated with the positive electrode active material layer and the negative electrode active material layer.

The secondary battery disclosed in Patent Document 1 is suitably applied to a long device but has a problem in that a plurality of bending regions is formed, whereby the uncoated portion is widened, and therefore energy density is lowered.

Patent Document 2 relates to a battery cell including a current collector having at least one uncoated portion that partitions an electrode mixture, wherein the portion of a battery case at which the uncoated portion is located is bent, whereby the shape of the battery cell is changed.

In Patent Document 2, an electrode assembly is separated from the battery case, whereby there is a problem in that a bent portion of the battery case and a bent portion of the electrode assembly may be misaligned with each other when the battery cell is bent.

Patent Document 3 discloses a battery cell configured such that a recess is formed in a sealing portion in order to prevent occurrence of wrinkles at the sealed portion when the battery cell is bent. In this structure, however, an electrode mixture layer may be separated from an electrode assembly when the electrode assembly is bent.

Therefore, there is a high necessary for a battery cell applicable to devices having various shapes, such as a foldable or bendable battery cell, and technology capable of securing safety of the battery cell while preventing a decrease in capacity of the battery cell.

PRIOR ART DOCUMENTS (Patent Document 1) Korean Patent Application Publication No. 2012-0022385 (2012.03.12)
(Patent Document 2) Korean Patent Application Publication No. 2017-0033513 (2017.03.27)
(Patent Document 3) Korean Patent Application Publication No. 2015-0096325 (2015.08.24)

DISCLOSURE

Technical Problem

The present invention has been made in view of the above problems, and it is an object of the present invention to provide a foldable pouch-shaped battery cell configured such that an uncoated portion, which is a portion coated with no electrode mixture, is formed at an electrode and a stepped structure having a recessed shape is formed at the portion of a pouch-shaped battery case corresponding to the uncoated portion, whereby it is possible to prevent dislocation of an electrode assembly, and therefore safety of the pouch-shaped battery cell is improved, and a method of manufacturing the same.

Technical Solution

A pouch-shaped battery cell according to the present invention to accomplish the above object is a pouch-shaped battery cell having an electrode assembly received in a pouch-shaped battery case, wherein the electrode assembly includes positive electrodes and negative electrodes, each of the positive electrodes and the negative electrodes being configured to have a structure in which the length of the electrode in an overall width direction is less than the length of the electrode in an overall length direction, each of the positive electrodes and the negative electrodes has an uncoated portion, which is a portion coated with no electrode mixture, formed parallel to outer peripheries of the electrode in the overall width direction or outer peripheries of the electrode in the overall length direction and a coated portion, which is coated with an electrode mixture, formed at the remaining portion of the electrode excluding the uncoated portion, and a stepped structure is formed at the part of the pouch-shaped battery case corresponding to the uncoated portion so as to be recessed inwards.

In the pouch-shaped battery cell according to the present invention, positive electrode tabs and negative electrode tabs may protrude from one of the outer peripheries of the electrode assembly in the overall width direction.

In the pouch-shaped battery cell according to the present invention, each of the positive electrodes and the negative electrodes may have a first coated portion and a second coated portion formed symmetrical or asymmetrical with respect to the uncoated portion, and each of the positive electrodes and the negative electrodes may be folded at the uncoated portion.

In addition, a positive electrode tab or a negative electrode tab may be formed so as to protrude from one of the first coated portion and the second coated portion.

In the pouch-shaped battery cell according to the present invention, an insulating member may be added to outer surfaces of a part of the uncoated portion and a portion of the coated portion as a border portion between the uncoated portion and the coated portion.

In addition, the insulating member may be an insulation tape or an insulating solution.

In the pouch-shaped battery cell according to the present invention, a wrinkled folding line may be formed at the uncoated portion.

In the pouch-shaped battery cell according to the present invention, the pouch-shaped battery case may include a first battery case and a second battery case, and a stepped portion may be formed at a portion of at least one of the first battery case and the second battery case corresponding to the uncoated portion so as to be recessed inwards.

In addition, the recessed stepped portion of the pouch-shaped battery case may be attached to each of the uppermost electrode and the lowermost electrode of the electrode assembly.

In the pouch-shaped battery cell according to the present invention, the pouch-shaped battery case may be folded as a result of the electrode assembly being folded, and a notch may be formed in a sealed portion located at the portion of the pouch-shaped battery case that is folded.

In addition, the present invention provides a method of manufacturing the pouch-shaped battery cell. Specifically, the method includes (a) coating an electrode sheet to form a coated portion, which is a portion coated with an electrode mixture, and an uncoated portion, which is a portion coated with no electrode mixture; (b) adding an insulating member to outer surfaces of a part of the coated portion and a part of the uncoated portion as a border portion between the coated portion and the uncoated portion; (c) rolling the electrode sheet; and (d) slitting the electrode sheet of step (c).

In the method according to the present invention, an insulating tape may be attached or an insulation solution may be applied in step (b).

The method according to the present invention may include a process of manufacturing an electrode assembly by stacking a positive electrode and a negative electrode manufactured by cutting the electrode sheet slit in step (d) in the state in which a separator is interposed therebetween, receiving the electrode assembly in a pouch-shaped battery case having a stepped portion formed thereat, and hermetically sealing the pouch-shaped battery case.

In addition, the method according to the present invention may further include a process of receiving the electrode assembly in a pouch-shaped battery case having stepped portions formed thereat and attaching each of the uppermost electrode and the lowermost electrode of the electrode assembly to a corresponding one of the stepped portions of the pouch-shaped battery case.

Advantageous Effects

As is apparent from the above description, a pouch-shaped battery cell according to the present invention is configured to have a structure in which an uncoated portion, which is a portion coated with no electrode mixture, is formed at each of a positive electrode and a negative electrode, and an electrode assembly is folded at the uncoated portion, whereby it is possible to prevent separation of an electrode mixture layer from an electrode current collector as a result of folding.

In addition, a stepped portion having a recessed shape is formed at the portion of a pouch-shaped battery case corresponding to the uncoated portion of the electrode assembly, whereby it is possible to seat and fix a coated portion of the electrode assembly onto a protruding portion of the pouch-shaped battery case, which relatively protrudes.

Also, in the case in which the uncoated portion of the electrode assembly is attached to the stepped portion of the pouch-shaped battery case, it is possible to more securely fix the position of the electrode assembly. Consequently, it is possible to prevent separation of the electrode assembly, and therefore it is possible to prevent damage to electrode tabs and an electrode lead.

DESCRIPTION OF DRAWINGS

FIG. 1 is a plan view showing the state in which electrodes according to the present invention are stacked.

FIG. 2 is a side view of an electrode according to the present invention.

FIG. 3 is a side view of an electrode having a folding line formed thereat.

FIG. 4 is a side view of pouch-shaped battery cells according to the present invention.

FIG. 5 is a partial enlarged view of a vertical section of a pouch-shaped battery cell according to the present invention.

FIG. 6 is a perspective view of a pouch-shaped battery cell having a notch formed in a sealed portion thereof.

FIG. 7 is a perspective view showing a process of upwardly bending a pouch-shaped battery cell according to the present invention based on an x axis.

FIG. 8 is a perspective view showing a process of downwardly bending the pouch-shaped battery cell according to the present invention based on the x axis.

FIG. 9 is a perspective view showing a process of upwardly bending a pouch-shaped battery cell according to the present invention based on a y axis.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

A pouch-shaped battery cell according to the present invention is configured to have a structure in which an electrode assembly is received in a pouch-shaped battery case made of a laminate sheet including an outer resin layer, a barrier layer, and an inner adhesive layer in a hermetically sealed state. The electrode assembly may be a stacked type electrode assembly, which is configured to have a structure in which a positive electrode and a negative electrode are stacked in the state in which a separator is interposed therebetween, or a laminated and stacked type electrode assembly, which is configured to have a structure in which two or more bicells, each of which positive electrodes and negative electrodes are disposed in the state in which two separators are interposed respectively therebetween, are laminated in a state of being stacked.

Each of the positive electrode and the negative electrode is configured to have a rectangular planar shape of a structure in which the length of the electrode in an overall width direction is less than the length of the electrode in an overall length direction, and has a structure in which an uncoated portion, which is a portion coated with no electrode mixture, is formed parallel to the outer peripheries of the electrode in the overall width direction or the outer peripheries of the electrode in the overall length direction and a coated portion, which is coated with an electrode mixture, is formed at the remaining portion of the electrode excluding the uncoated portion.

The pouch-shaped battery cell according to the present invention is foldable, wherein the uncoated portion is folded, whereby the pouch-shaped battery cell is folded.

In connection therewith, an electrode mixture formed on an electrode current collector by coating may be separated from the folding portion of the electrode current collector when the pouch-shaped battery cell is folded. In order to prevent this, in the present invention, the uncoated portion is formed, and the pouch-shaped battery cell is folded at the uncoated portion, whereby it is possible to prevent the above problem.

FIG. 1 is a plan view showing the state in which electrodes according to the present invention are stacked, and FIG. 2 is a side view of an electrode according to the present invention.

Referring to FIG. 1, electrodes (a) and electrodes (b) are shown. Referring to FIG. 2, a side view of the positive electrode (a) of FIG. 1 is shown. In FIG. 1, a separator interposed between a positive electrode and a negative electrode is omitted for convenience of description.

The electrodes (a) and the electrodes (b) are stacks of positive electrodes 110 and 210 and negative electrodes 120 and 220 configured to have a structure in which the length of the electrode in the overall width direction, i.e. an x-axis direction, is less than the length of the electrode in the overall length direction, i.e. a y-axis direction. Each of positive electrode tabs 112 and 212 and negative electrode tabs 122 and 222 protrudes from one of the outer peripheries of a corresponding one of the electrodes in the overall width direction.

Each of the electrodes (a) has a structure in which an uncoated portion, which is a portion coated with no electrode mixture, is formed parallel to the outer peripheries of the electrode in the overall width direction. The positive electrode 110 has coated portions 111 formed symmetrical with respect to an uncoated portion 115 formed parallel to the outer peripheries of the electrode in the overall width direction, and the negative electrode 120 has coated portions 121 formed symmetrical with respect to an uncoated portion 125 formed parallel to the outer peripheries of the electrode in the overall width direction.

For the positive electrode 110, an insulating member 113 is added to outer surfaces of a part of the uncoated portion 115 and a part of each coated portion 111 as a border portion between the uncoated portion 115 and the coated portion 111. For the negative electrode 120, an insulating member 123 is added to outer surfaces of a part of the uncoated portion 125 and a part of each coated portion 121 as a border portion between the uncoated portion 125 and the coated portion 121.

Each of the electrodes (b) has a structure in which an uncoated portion, which is a portion coated with no electrode mixture, is formed parallel to the outer peripheries of the electrode in the overall length direction. The positive electrode 210 has coated portions 211 formed symmetrical with respect to an uncoated portion 215 formed parallel to the outer peripheries of the electrode in the overall length direction, and the negative electrode 220 has coated portions 221 formed symmetrical with respect to an uncoated portion 225 formed parallel to the outer peripheries of the electrode in the overall length direction.

For the positive electrode 210, an insulating member 213 is added to outer surfaces of a part of the uncoated portion 215 and a part of each coated portion 211 as a border portion between the uncoated portion 215 and the coated portion 211. For the negative electrode 220, an insulating member 223 is added to outer surfaces of a part of the uncoated portion 225 and a part of each coated portion 221 as a border portion between the uncoated portion 225 and the coated portion 221.

Meanwhile, the present invention relates to a pouch-shaped battery cell that is folded based on an uncoated portion, and therefore coated portions may be formed asymmetrical with respect to the uncoated portion, unlike what is shown in FIGS. 1 and 2.

Although the present invention relates to a foldable pouch-shaped battery cell, it is preferable to understand that the pouch-shaped battery cell does not always remain folded when in use and may be folded or unfolded as needed.

Consequently, it is preferable for the electrode tabs to protrude in one direction in the state in which the pouch-shaped battery cell according to the present invention is not folded. The electrode tabs protrude from one of the outer peripheries of the electrode in the overall width direction.

In addition, on the assumption that, for the electrodes (a), the coated portions 111 and 121 located above the uncoated portions 115 and 125 are first coated portions and the coated portions 111 and 121 located under the uncoated portions 115 and 125 are second coated portions, the positive electrode tab 112 and the negative electrode tab 122 protrude from the first coated portions. On the assumption that, for the electrodes (b), the coated portions 211 and 221 located on the left sides of the uncoated portions 215 and 225 are first coated portions and the coated portions 211 and 221 located on the right sides of the uncoated portions 215 and 225 are second coated portions, the positive electrode tab 212 and the negative electrode tab 222 protrude from the first coated portions. Since the positive electrode tab or the negative electrode tab is formed at any one coated portion, as described above, the positions of a positive electrode terminal and a negative electrode terminal may be uniformly fixed irrespective of whether the pouch-shaped battery cell is folded or unfolded.

Each of the insulating members 113 and 213 may be a member configured to have a structure in which an insulating layer is attached to an adhesive layer as a substrate, such as an insulating tape. Consequently, the insulating tape may be added to the border portion between the coated portion and the uncoated portion by attachment, or an insulating solution obtained by dissolving an insulating material in a solvent may be added to the border portion between the coated portion and the uncoated portion by coating.

The insulating layer of the insulating tape may be made of cast polypropylene (CPP) or polyethylene terephthalate (PET).

The insulating solution may be manufactured, for example, by mixing styrene butadiene rubber (SBR), alumina ($Al_2O_3$), and carboxymethyl cellulose (CMC) in a weight ratio of 80:20:0.008 to prepare a mixture and adding 40 weight % of distilled water to the mixture.

A method of manufacturing a pouch-shaped battery cell according to the present invention may include (a) a step of coating an electrode sheet to form a coated portion, which is a portion coated with an electrode mixture, and an uncoated portion, which is a portion coated with no electrode mixture; (b) a step of adding an insulating member to outer surfaces of a part of the coated portion and a part of the uncoated portion as a border portion between the coated portion and the uncoated portion; (c) a step of rolling the electrode sheet; and (d) a step of slitting the electrode sheet of step (c).

The insulating member may be formed on the coated portion by coating so as to have a size of at least 0.1 mm. Preferably, the insulating member is formed on the coated portion by coating so as to overlap the coated portion by less than 0.4 mm. In order to prevent an increase in overall thickness of the electrode due to addition of the insulating member, however, it is preferable for the thickness of the insulating member not to be greater than the thickness of the coated portion based on the insulating member formed on the uncoated portion by coating.

Since the insulation member is added to the border portion between the uncoated portion and the coated portion, as in the present invention, it is possible to prevent occurrence of short circuit due to contact between the positive electrode and the negative electrode even though the separator interposed between the positive electrode and the negative electrode shrinks.

In connection therewith, since the area of the coated portion of the negative electrode is generally designed so as to be greater than the area of the coated portion of the positive electrode, the coated portion of the negative electrode is disposed in contact with the coated portion of the positive electrode in the stacking direction. In the case in which the separator shrinks due to overheating of the electrode assembly, therefore, short circuit may occur due to contact between the coated portion of the negative electrode and the coated portion of the positive electrode.

In the present invention, since the insulating member is added to the border between the coated portion and the uncoated portion, it is possible to prevent contact between the coated portion of the negative electrode and the coated portion of the positive electrode even though the separator shrinks.

In the electrode according to the present invention, it is preferable for the height of the uncoated portion, which corresponds to the distance between the first coated portion and the second coated portion, to be uniformly formed in a lateral direction of the uncoated portion perpendicular thereto. In order to prevent the coated portion from being separated from the electrode current collector even though the electrode assembly is folded 180 degrees, the height of the uncoated portion may be set in consideration of the thickness of the electrode current collector and the thickness of the coated portion formed on one surface or opposite surfaces of the electrode current collector by coating.

FIG. 3 is a side view of an electrode having a folding line formed thereat.

Referring to FIG. 3, the electrode of FIG. 3 is similar to the electrode of FIG. 2 but is different from the electrode of FIG. 2 in that a wrinkled folding line 318 is formed at an uncoated portion 315.

In the case in which the folding line 318 is formed, as described above, stress concentrated on a bent portion when the electrode is folded is dispersed, whereby it is possible to prevent damage to the bent portion.

The above description of the electrode of FIG. 2 may be equally applied to an electrode tab, coated portion, uncoated portion, and insulating member of the electrode of FIG. 3.

Meanwhile, the method of manufacturing the pouch-shaped battery cell according to the present invention may include a process of manufacturing an electrode assembly by stacking a positive electrode and a negative electrode manufactured by cutting the electrode sheet slit in step (d) in the state in which a separator is interposed therebetween, receiving the electrode assembly in a pouch-shaped battery case having a stepped portion formed thereat, and hermetically sealing the pouch-shaped battery case.

FIG. 4 is a side view of pouch-shaped battery cells according to the present invention.

Referring to FIG. 4, a pouch-shaped battery cell (a) and a pouch-shaped battery cell (b) include first battery cases 431 and 531 and second battery cases 432 and 532, respectively. The first battery case 431 of the pouch-shaped battery cell (a) has formed therein a receiving portion 433 configured to receive an electrode assembly, and a stepped portion 436 is formed at the receiving portion 433 so as to be recessed inwards. The stepped portion 436 is formed at a portion corresponding to the portion of the electrode assembly at which an uncoated portion is located. The second battery case 432 has a flat shape having no receiving portion formed therein.

A receiving portion 533 configured to receive an electrode assembly is formed in each of the first battery case 531 and the second battery case 532 of the pouch-shaped battery cell (b), and a stepped portion 536 is formed at the receiving portion 533 so as to be recessed inwards. The stepped portion 536 is formed at a portion corresponding to the portion of the electrode assembly at which an uncoated portion is located.

Since the pouch-shaped battery cell (a) and the pouch-shaped battery cell (b) are configured respectively such that the stepped portions 436 and 536 are formed so as to correspond to the portions of the electrode assemblies at which the uncoated portions are located, as described above, coated portions of the electrode assemblies are received respectively in protruding portions 437 and 537, which relatively protrude, whereby fixation in position of the electrode assemblies in the battery cases may be achieved.

In addition, the method of manufacturing the pouch-shaped battery cell according to the present invention may further include a process of receiving the electrode assembly in a pouch-shaped battery case having a stepped portion formed thereat and attaching the uppermost electrode and the lowermost electrode of the electrode assembly to the stepped portion of the pouch-shaped battery case.

In connection therewith, FIG. 5 is a partial enlarged view of a vertical section of a pouch-shaped battery cell according to the present invention.

Referring to FIG. 5, an electrode assembly is the electrode assembly (a) of FIG. 1, and the separator is omitted for convenience of description. A battery case is the battery case of the pouch-shaped battery cell (b) shown in FIG. 4.

The electrode assembly is a stacked type electrode assembly, which is configured to have a structure in which positive electrodes 110 and negative electrodes 120 are alternately stacked in the state in which separators are interposed respectively between the positive electrodes and the negative electrodes. Each of the positive electrodes 110 and the negative electrodes 120 is provided with a coated portion and an uncoated portion. A stepped portion of a first battery case 531 is attached to the uncoated portion of the negative electrode 120 located at the uppermost end of the electrode assembly, and a stepped portion of a second battery case 532 is attached to the uncoated portion of the positive electrode 110 located at the lowermost end of the electrode assembly.

Since the electrode assembly is coupled to the pouch-shaped battery case, as described above, it is possible to prevent movement of the electrode assembly in the battery case due to external impact. Consequently, it is possible to prevent damage to electrode tabs and an electrode lead due to movement of the electrode assembly.

Pouch-shaped battery cells manufactured using the method of manufacturing the pouch-shaped battery cell described above are shown in FIGS. 6 to 9.

FIG. 6 is a perspective view of a pouch-shaped battery cell having a notch formed in a sealed portion thereof.

In the pouch-shaped battery cell according to the present invention, a notch may be formed in a battery case in order to prevent damage to the battery case due to tensile force generated at a folding portion of the battery case at the time of folding.

Referring to FIG. 6, a stepped portion 636 and receiving portions 633 are formed at each of a first battery case 631 and a second battery case 632. In the case in which the pouch-shaped battery case is folded upwards based on the stepped portion 636, as shown in FIG. 6, a sealed portion of the pouch-shaped battery case may be extended by the two receiving portions 633, which protrude. Consequently, a notch 660 is formed in the sealed portion of the portion of the pouch-shaped battery case that is folded, as in the pouch-shaped battery case of FIG. 6, whereby it is possible to prevent damage to the pouch-shaped battery case or to prevent release of sealing of the sealed portion.

FIG. 7 is a perspective view showing a process of upwardly bending a pouch-shaped battery cell according to the present invention based on an x axis, and FIG. 8 is a perspective view showing a process of downwardly bending the pouch-shaped battery cell according to the present invention based on the x axis.

Referring to FIGS. 7 and 8, the pouch-shaped battery cell has a structure in which a stepped portion 736 is formed at a pouch-shaped battery case so as to be parallel to the x axis, i.e. a structure in which a stepped portion is formed at only a first battery case, which is an upper battery case, as in the pouch-shaped battery cell (a) of FIG. 4.

Consequently, in the case in which the pouch-shaped battery cell is bent upwards, as shown in FIG. 7, the height of an uncoated portion of an electrode assembly and the distance between protruding portions 737 must be set in consideration of the height of the protruding portions.

However, in the case in which the pouch-shaped battery cell is bent downwards, as shown in FIG. 8, the height of the uncoated portion of the electrode assembly and the distance between the protruding portions may be set to be less than the height of the uncoated portion of the electrode assembly of FIG. 7 and the distance between the protruding portions, since no protruding portions are formed on a second battery case, which is a lower battery case.

Unlike what is shown in FIG. 8, the pouch-shaped battery cell may have a structure in which a stepped portion and protruding portions are formed at each of the first battery case and the second battery case, as in the pouch-shaped battery cell (b) of FIG. 4.

FIG. 9 is a perspective view showing a process of upwardly bending a pouch-shaped battery cell according to the present invention based on a y axis.

Referring to FIG. 9, a pouch-shaped battery cell that has a narrow and long shape may be applied depending on the shape of a device. As shown in FIG. 9, it is possible to manufacture the pouch-shaped battery cell so as to be bent based on the y axis, which is parallel to the overall length direction of the pouch-shaped battery cell.

The pouch-shaped battery cell of FIG. 9 has a structure in which a stepped portion 836 is formed at a pouch-shaped battery case so as to be parallel to the y axis, i.e. a structure in which a stepped portion is formed at only a first battery case, which is an upper battery case, as in the pouch-shaped battery cell (a) of FIG. 4.

Consequently, the height of an uncoated portion of an electrode assembly and the distance between protruding portions 837 must be set in consideration of the height of the protruding portions.

Although FIG. 9 shows the case in which the pouch-shaped battery cell is bent upwards, the pouch-shaped battery cell may be bent downwards, as shown in FIG. 8.

In addition, unlike what is shown in FIG. 9, the pouch-shaped battery cell may have a structure in which a stepped portion and protruding portions are formed at each of the first battery case and the second battery case, as in the pouch-shaped battery cell (b) of FIG. 4.

As described above, the pouch-shaped battery cell according to the present invention is configured such that the uncoated portion is formed at the electrode assembly and the stepped portion is formed at the pouch-shaped battery case so as to correspond to the uncoated portion, whereby it is possible for a user to fold or unfold the pouch-shaped battery cell when in use.

In addition, since the electrode assembly and the inner surface of the pouch-shaped battery case are partially coupled to each other, it is possible to prevent movement of the electrode assembly in the pouch-shaped battery case, and therefore it is possible to improve safety of the pouch-shaped battery cell.

Those skilled in the art to which the present invention pertains will appreciate that various applications and modifications are possible within the category of the present invention based on the above description.

DESCRIPTION OF REFERENCE NUMERALS

110, 310: Positive electrodes
111, 121, 211, 221, 311: Coated portions
112, 212, 312: Positive electrode tabs
113, 123, 213, 223, 313: Insulating members
115, 125, 215, 225, 315: Uncoated portions
120, 220: Negative electrodes
122, 222: Negative electrode tabs
431, 531, 631: First battery cases
432, 532, 632: Second battery cases
433, 533, 633: Receiving portions
436, 536, 636, 736, 836: Stepped portions
437, 537, 737, 837: Protruding portions
660: Notch

INDUSTRIAL APPLICABILITY

As is apparent from the above description, a pouch-shaped battery cell according to the present invention is configured to have a structure in which an uncoated portion, which is a portion coated with no electrode mixture, is formed at each of a positive electrode and a negative electrode, and an electrode assembly is folded at the uncoated portion, whereby it is possible to prevent separation of an electrode mixture layer from an electrode current collector as a result of folding.

In addition, a stepped portion having a recessed shape is formed at the portion of a pouch-shaped battery case corresponding to the uncoated portion of the electrode assembly, whereby it is possible to seat and fix a coated portion of the electrode assembly onto a protruding portion of the pouch-shaped battery case, which relatively protrudes.

Also, in the case in which the uncoated portion of the electrode assembly is attached to the stepped portion of the pouch-shaped battery case, it is possible to more securely fix the position of the electrode assembly. Consequently, it is possible to prevent separation of the electrode assembly, and therefore it is possible to prevent damage to electrode tabs and an electrode lead.

The invention claimed is:

1. A pouch-shaped battery cell having an electrode assembly received in a pouch-shaped battery case, wherein the electrode assembly comprises positive electrodes and negative electrodes, each of the positive electrodes and the negative electrodes having a structure in which a length of the electrode in an overall width direction is less than a length of the electrode in an overall length direction, each of the positive electrodes and the negative electrodes has an uncoated portion, which is a portion not coated with an electrode mixture, extending parallel to outer peripheries of the electrode in the overall width direction or outer peripheries of the electrode in the overall length direction and a coated portion, which is coated with the electrode mixture, disposed at a remaining portion of the electrode excluding the uncoated portion, and a stepped structure is formed at a part of the pouch-shaped battery case adjacent to the uncoated portion, the stepped structure being recessed inwards from adjacent portions of the pouch-shaped battery case, wherein each of the positive electrodes and the negative electrodes has a first coated portion and a second coated portion disposed at opposite sides of the uncoated portion, and each of the positive electrodes and the negative electrodes is folded at a respective one of the uncoated portions, wherein each of the positive electrodes and the negative electrodes has a respective insulating member overlying outer surfaces of a part of a respective one of the uncoated portions and a portion of each respective coated portion, each insulating member serving as a border portion extending between the respective uncoated portion and the respective coated portion, and wherein the insulating members are only located adjacent to locations at which the positive electrodes and the negative electrodes are folded.

2. The pouch-shaped battery cell according to claim 1, wherein positive electrode tabs and negative electrode tabs protrude from an outer periphery of the electrode assembly in the overall width direction.

3. The pouch-shaped battery cell according to claim 1, wherein a positive electrode tab or a negative electrode tab protrudes from one of the first coated portion or the second coated portion of each of the electrodes.

4. The pouch-shaped battery cell according to claim 1, wherein each insulating member is an insulation tape or an insulating solution.

5. The pouch-shaped battery cell according to claim 1, wherein a wrinkled folding line extends along each uncoated portion.

6. The pouch-shaped battery cell according to claim 1, wherein the pouch-shaped battery case comprises a first battery case and a second battery case, and wherein the stepped structure is formed at a portion of at least one of the first battery case and the second battery case.

7. The pouch-shaped battery cell according to claim 6, wherein a respective stepped structure of the first battery case and the second battery case is attached to each of an uppermost electrode and a lowermost electrode of the electrode assembly.

8. The pouch-shaped battery cell according to claim 1, wherein the pouch-shaped battery case and the electrode assembly are folded, and wherein a notch is formed in a sealed portion located at a portion of the pouch-shaped battery case that is folded.

* * * * *